(12) United States Patent
Pornrojnangkool et al.

(10) Patent No.: US 11,432,064 B2
(45) Date of Patent: Aug. 30, 2022

(54) HEADPHONE SYSTEMS AND METHODS FOR EMULATING THE AUDIO PERFORMANCE OF MULTIPLE DISTINCT HEADPHONE MODELS

(71) Applicant: TiTum Audio, Inc., Bangkok (TH)

(72) Inventors: Tarin Pornrojnangkool, Bangkok (TH); Sarun Wongnoi, Maehongson (TH)

(73) Assignee: TITUM AUDIO, INC., Newark, DE (US)

( * ) Notice: Subject to any disclaimer, the term of this patent is extended or adjusted under 35 U.S.C. 154(b) by 0 days.

(21) Appl. No.: 15/734,091

(22) PCT Filed: Jun. 6, 2019

(86) PCT No.: PCT/TH2019/000017
§ 371 (c)(1),
(2) Date: Dec. 1, 2020

(87) PCT Pub. No.: WO2019/236015
PCT Pub. Date: Dec. 12, 2019

(65) Prior Publication Data
US 2021/0227312 A1    Jul. 22, 2021

Related U.S. Application Data

(60) Provisional application No. 62/681,575, filed on Jun. 6, 2018.

(51) Int. Cl.
*H04R 1/10* (2006.01)
*G06F 16/61* (2019.01)
(Continued)

(52) U.S. Cl.
CPC ......... *H04R 1/1041* (2013.01); *G06F 3/0482* (2013.01); *G06F 3/165* (2013.01);
(Continued)

(58) Field of Classification Search
CPC ........................................................ H04R 1/10
See application file for complete search history.

(56) References Cited

U.S. PATENT DOCUMENTS 10,175,937 B1 * 1/2019 Olive .................. G06F 3/165
2012/0096125 A1   4/2012 Kallai et al.
(Continued)

FOREIGN PATENT DOCUMENTS

| CN | 103685677 A | 3/2014 |
| CN | 106535077 A | 3/2017 |
| CN | 107071683 A | 8/2017 |

OTHER PUBLICATIONS

International Search Report dated Oct. 9, 2019 in International Application No. PCT/TH2019/000017.
(Continued)

*Primary Examiner* — Olisa Anwah
(74) *Attorney, Agent, or Firm* — Kim IP Law Group LLC

(57) ABSTRACT

A headphones system includes reference headphones having native audio performance characteristics, and a personal communication device that generates a user interface presenting visual representations of other headphones. In response to user selection of a visual representation of particular headphones, the personal communication device identifies a corresponding current sound profile establishing a mapping between audio performance characteristics of the particular user selected headphones and the native audio performance characteristics, and communicates the current sound profile to the reference headphones. The reference headphones includes a digital signal processor, which converts digital audio data received from an audio data source such as a media player into tranformed digital audio data in accordance with the current sound profile; and a set of speakers configured to output transformed sounds in accordance with the transformed digital audio data to emulate the
(Continued)

audio performance characteristics of the particular user-selected headphones were they physically worn by the user.

15 Claims, 4 Drawing Sheets

(51) Int. Cl.
*G06F 3/0482* (2013.01)
*G06F 3/16* (2006.01)
*H02J 9/06* (2006.01)

(52) U.S. Cl.
CPC ............... *G06F 16/61* (2019.01); *H02J 9/06* (2013.01); *H04R 1/1008* (2013.01); *H04R 1/1025* (2013.01); *H04R 2420/01* (2013.01); *H04R 2420/07* (2013.01)

(56) References Cited

U.S. PATENT DOCUMENTS

| | | |
|---|---|---|
| 2013/0156213 A1 | 6/2013 | Pan et al. |
| 2014/0270254 A1* | 9/2014 | Oishi .................. H04R 1/1041 381/98 |
| 2015/0099583 A1 | 4/2015 | Kulavik |
| 2019/0394554 A1* | 12/2019 | Lee ..................... H01M 50/105 |

OTHER PUBLICATIONS

Written Opinion dated Oct. 9, 2019 in International Application No. PCT/TH2019/000017.

* cited by examiner

HEADPHONE SYSTEMS AND METHODS FOR EMULATING THE AUDIO PERFORMANCE OF MULTIPLE DISTINCT HEADPHONE MODELS

CROSS-REFERENCE TO RELATED APPLICATIONS

This application is a U.S. national phase application under 35 U.S.C. § 371 of International Application No. PCT/TH2019/000017, filed on Jun. 6, 2019, which claims priority to U.S. Provisional Patent Application No. 62/681,575 filed on Jun. 6, 2018, the disclosures of each of which are hereby incorporated by reference in their entirety for all purposes.

TECHNICAL FIELD

Aspects of the present disclosure relate to a headphone system including (a) reference physical headphones wearable by a user; and (b) a personal communication/computing device having a headphone management app and a media player that execute thereon. The headphone management app (i) presents a collection or list of multiple distinct headphones or headphone types corresponding to different headphone models and/or manufacturers to the user; (ii) receives user input identifying currently selected headphones from among this list; and (iii) communicates a current sound profile corresponding to the currently selected headphones to the reference headphones. In association with receiving digital audio data or analog audio signals corresponding to media player output, the reference headphones generate and output transformed sounds or sound waves in accordance with the current sound profile, thereby emulating the audio performance or characteristics of the currently selected headphones were they worn by the user instead of the reference physical headphones.

BACKGROUND

A very wide variety of headphones presently exist. Different types or models of headphones produced by the same or different manufacturers can have noticeably different or very distinct audio performance capabilities. For instance, a particular headphone model produced by a given headphone manufacturer may be well suited for producing sounds with pronounced low end frequency or bass response; whereas another headphone model provided the same or a different headphone manufacturer may be less well suited for pronounced bass response, and may instead offer overall balanced audio frequency response or enhanced high-end frequency response. Moreover, the audio performance of any given set of headphones can change on a dynamic basis with changing audio volume. As a result, two distinct headphone models that apparently would offer equivalent or near-equivalent audio performance for a constant volume level may actually exhibit noticeably different audio performance with respect to different volume ranges or volume changes.

Because of the large or very large number of headphone models in the marketplace and the non-negligible or significant cost exhibited by many headphone models, the likelihood that a typical or average headphone user can quickly, easily, or conveniently experience the audio performance of a wide or very wide range of headphone models prior to making a headphone purchase is very low. Similarly, the likelihood that the typical headphone user will have multiple or many different headphone models available to them for their personal audio listing activities on an ongoing, regular, or day to day basis is very low.

A need exists for enabling headphone users to quickly, easily, and conveniently experience the audio performance of a very wide range of headphone models across multiple or many headphone manufacturers, in a cost effective and on-demand manner.

SUMMARY

In accordance with an aspect of the present disclosure, a method or process for selectively emulating the audio performance of a user selected set of virtualized headphones from among a plurality of user selectable sets of virtualized headphones, each set of virtualized headphones within the plurality of sets of virtualized headphones corresponding to a particular model of physical headphones and having particular audio performance characteristics, includes: (1) providing a set of reference physical headphones having native audio performance characteristics, wherein the set of reference physical headphones includes: a set of power sources; a digital signal processor (DSP) coupled to the set of power sources; a memory coupled to the set of power sources; a set of audio inputs coupled to the DSP, including a digital audio data input and an analog audio signal input; and a set of speakers coupled to the DSP and by which analog audio signals are output; (2) providing a media player configured for communicating digital audio data or analog audio signals to the set of reference physical headphones while in an audio play or playback mode; (3) providing a library storing a sound profile for each set of virtualized headphones, each sound profile corresponding to audio performance characteristics of the set of virtualized headphones relative to the native audio performance characteristics of the reference physical headphones; (4) providing a user interface that presents visual indications of multiple user-selectable virtualized headphones; and (5) performing a virtualized headphones emulation process, wherein the virtualized headphones emulation process includes: receiving user input by way of the user interface to establish a first or next selected set of virtualized headphones; storing in the memory of the reference physical headphones a current sound profile corresponding to the first or next selected set of virtualized headphones; receiving at the reference headphones digital audio data or analog audio signals output by the media player; converting by way of the DSP the received digital audio data or analog audio signals into transformed digital audio data in accordance with the current sound profile; converting the transformed digital audio data into transformed audio signals; and producing with the set of speakers transformed sounds using the transformed analog audio signals to emulate the audio performance characteristics of the first or next selected set of virtualized headphones.

The aforementioned method or process for selectively emulating the audio performance of a user selected set of virtualized headphones can further include repeating (5) the virtualized headphones emulation process to successively (a) select different current sound profiles corresponding to different sets of virtualized headphones in response to user input, (b) store in the memory of the reference physical headphones each current sound profile selected in response to user input, and (c) produce transformed sounds corresponding to each of the different sets of virtualized headphones to thereby emulate the audio performance characteristics thereof.

The set of power sources in various embodiments includes a main battery and a backup battery, and the set of reference physical headphones in various embodiments includes a first wireless communication unit coupled to the set of power sources, such that the method or process for selectively emulating the audio performance of a user selected set of virtualized headphones typically further includes: providing a personal communication device configured for wireless audio data communication and wire-based analog audio signal communication with the set of reference physical headphones, wherein the personal communication device includes: a processing unit; a memory coupled to the processing unit and storing program instructions executable by the processing unit corresponding to (i) a headphone management application program, which when executed by the processing unit provides the user interface, and selectively accesses sound profiles within the library or database and communicates a current sound profile to the set of reference physical headphones in response to user input; and (ii) the media player; and a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

The method or process for selectively emulating the audio performance of a user selected set of virtualized headphones can further include determining whether the main battery of the set of reference physical headphones is fully depleted; and de-powering or disabling the first wireless communication unit of the set of reference physical headphones if the main battery is fully depleted, while continuing to provide power to the DSP with the backup battery until the backup battery is fully depleted.

The set of reference physical headphones can further include a power management unit coupled to the main battery and the backup battery, wherein the main battery and the backup battery are respectively defined as a logical main battery and a logical backup battery corresponding to a pre-defined or predetermined electrical charge storage partition of a total electrical charge storage capacity of a unified or single physical battery or battery unit, and wherein the method or process for selectively emulating the audio performance of a user selected set of virtualized headphones can further include: determining by way of the power management unit whether currently stored electrical charge in the unified or single physical battery or battery unit has fallen below a threshold level or percentage relative to the total electrical charge storage capacity of the unified or single physical battery or battery unit, wherein the threshold level or percentage corresponds to full depletion of the logical main battery and full electrical charge storage capacity of the logical backup battery; and de-powering or disabling the first wireless communication unit if the stored electrical charge in the unified or single physical battery or battery unit has fallen below the threshold level or percentage, while continuing to provide power to the DSP as long as the unified or single physical battery or battery unit is not fully depleted.

The aforementioned library can be couplable to or can include a sound profile database that is remote from each of the personal communication device and the set of reference physical headphones, and which is accessible to the headphone management application program by way of data network communication over the Internet.

In accordance with an aspect of the present disclosure, a headphone system includes: (1) a set of reference physical headphones having native audio performance characteristics and including: (a) a set of power sources; (b) a set of audio inputs configured for receiving digital audio data or analog audio signals; (c) a memory coupled to the set of power sources and storing a current sound profile establishing audio performance characteristics of a current set of virtualized headphones relative to the native audio performance characteristics of the set of reference physical headphones; (d) a digital signal processor (DSP) coupled to the set of power sources, the set of audio inputs, and the memory, wherein the DSP is configured to process received digital audio data in accordance with the current sound profile to generate transformed digital audio data; (e) a digital to analog converter (DAC) configured to receive transformed digital audio data generated by the DSP; and (f) a set of speakers coupled to the DAC and configured for producing transformed sounds by outputting the transformed analog audio signals to emulate the audio performance characteristics of the current set of virtualized headphones.

The set of power sources can include a main battery and a backup battery, wherein the set of reference physical headphones further includes: (2) a first wireless communication unit configured for receiving digital audio data from a source external to the set of reference physical headphones, and wherein the set of reference physical headphones comprises circuitry configured for (i) powering the first wireless communication unit with the main battery, (ii) de-powering or disabling the first wireless communication circuit once the main battery is fully depleted, and (iii) continuing to provide power to the DSP once the main battery is fully depleted until the backup battery is fully depleted.

The main battery and the backup battery can be separate physical batteries or battery units.

Alternatively, the main battery and the backup battery can be logically defined with respect to a pre-defined or predetermined electrical charge storage partition of a unified or single physical physical battery or battery unit, wherein the set of reference physical headphones further includes: (3) a power management unit configured for de-powering or disabling the first wireless communication unit while continuing to provide power to the DSP after the current stored charge in the unified or single physical battery or battery unit has fallen to or below a threshold level, until the unified or single physical battery or battery unit is fully depleted.

The headphone system can further include: (4) a personal communication device having: a processing unit; a memory coupled to the processing unit and storing program instructions executable by the processing unit corresponding to (i) a headphone management application program, which when executed by the processing unit provides a user interface, selectively accesses a library storing sound profiles corresponding to different sets of virtualized headphones in response to user input, and communicates a current sound profile corresponding to a current user selected set of virtualized headphones to the set of reference physical headphones in response to user input; and (ii) a media player configured for outputting digital audio data or analog audio signals while in a play or playback mode; and a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

The headphone system can further include: (5) a remote sound profile database storing multiple sound profiles corresponding to different virtualized headphones, wherein the personal communication device is configured for data communication with the remote sound profile database by way of the Internet.

DETAILED DESCRIPTION

Figure 1A:
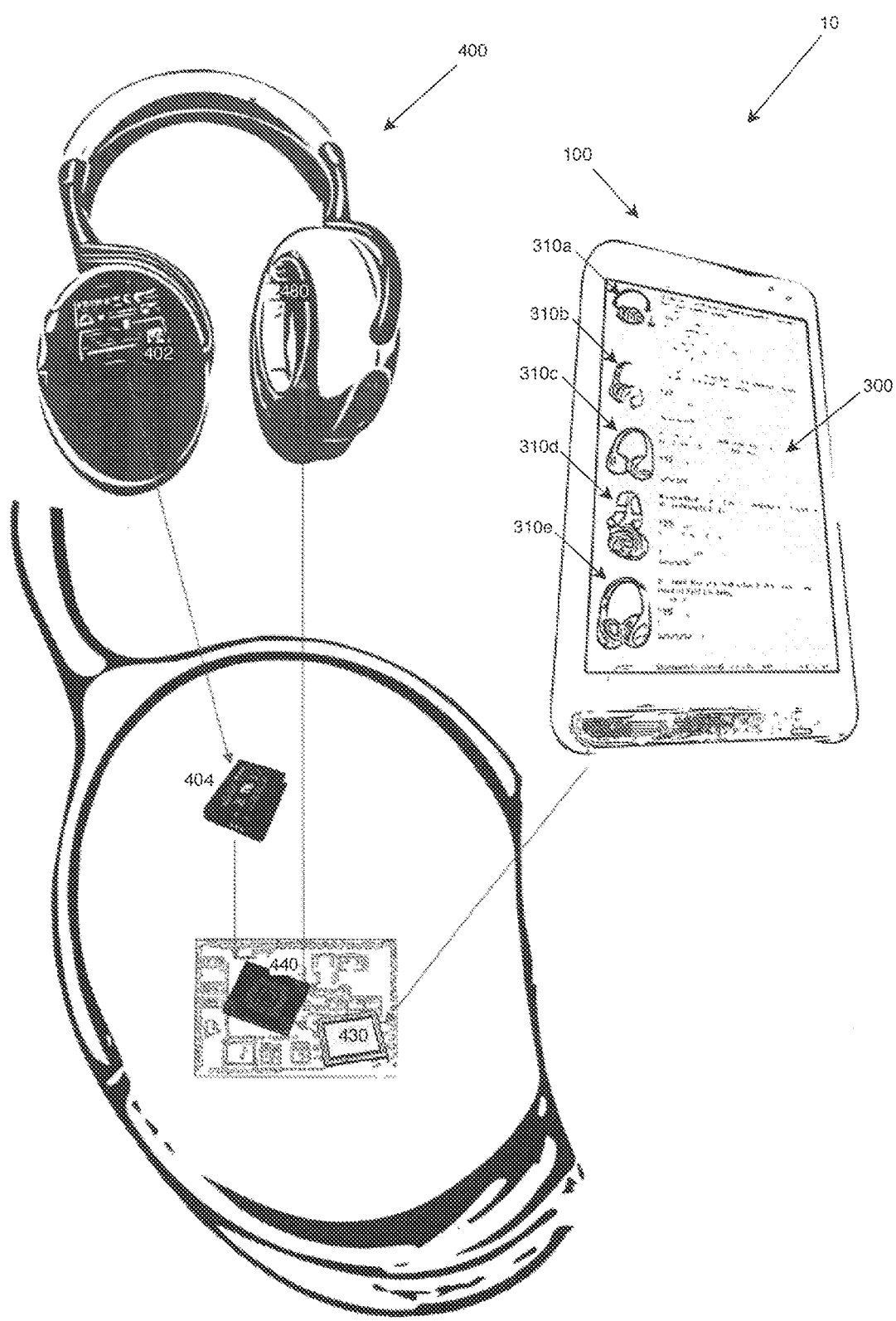
FIG. 1A is a block diagram showing aspects of a headphone system in accordance with a representative embodiment of the present disclosure.

In the present disclosure, the depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). Thus, in the context of the present disclosure, a set includes one or more elements, i.e., a set includes at least one element. In general, an element of a set can include or be a system, an apparatus, a device, a structure, an object, a process, a parameter, or a value depending upon the type of set under consideration.

Herein, the terms "headphones," "set of headphones," and "pair of headphones" correspond to essentially any type of device which, when in physical form, is or would be wearable over, on, and/or in a user's ear or ears, and which, when in physical form, is or would be configured for generating or outputting sounds or sound waves by way of a set of sound drivers, such that the user's ear or ears could receive the output sounds. In various embodiments, each sound driver of a set or pair of headphones includes at least one magnet, at least one voice coil, and at least one displaceable diaphragm configured for generating sounds or sound waves, in a manner readily understood by individuals having ordinary skill in the relevant art.

The term "reference headphones" or "reference physical headphones" as used herein can be defined as a physical, user wearable set of headphones that forms a physical portion of a system in accordance with an embodiment of the present disclosure. For purpose of brevity and simplicity, a set of reference headphones is typically defined to include at least 1 sound driver corresponding to a right audio channel, as well as at least 1 sound driver corresponding to a left audio channel.

Overview

Embodiments in accordance with the present disclosure are directed to a headphone system and method configured or configurable for emulating the audio performance, behavior, or characteristics of multiple distinct or different headphone types or models (e.g., many different models of headphones) produced by one or more distinct or different headphone manufacturers (e.g., many different manufacturers), using a single set of reference physical headphones.

In various embodiments, a headphone system includes reference physical headphones wearable or worn by a user, listener, or wearer; a personal communication/computing/audio/music device (hereafter personal communication device for purpose of brevity and clarity) such as a mobile phone, smartphone, or other type of device (e.g., a tablet computer, a laptop computer, a desktop computer, or other type of device that is configured or configurable for audio file playback such as by way of a media player executing thereon, and to which the reference physical headphones are coupled or couplable such that digital audio data or analog audio signals can be output to the reference physical headphones during audio file playback) having a processing unit and a memory, and which is configured for data communication with the reference headphones; a headphone management application program or app that includes one or more sets of program instructions executable or executed by the personal communication device; and a digital audio and/or digital audio-visual data file or data stream output device, unit, or module, such as a digital media player, which includes one or more program instruction sets executable or executed by the personal communication device.

In association with its execution, the headphone management app is configured for:
  (i) providing a user interface that presents, indicates, identifies, shows, displays, depicts, or lists multiple distinct or different user selectable headphones or headphone types corresponding to different headphone models and/or manufacturers, each of which in the context of the present disclosure corresponds to or can be defined as a set of virtualized, virtual, or emulatable headphones;
  (ii) receiving user input that defines currently selected headphones, e.g., a currently selected set of virtualized, virtual, or emulatable headphones, from among the multiple headphones or multiple virtualized, virtual, or emulatable headphones presented by the user interface;

(iii) identifying, determining, accessing, or retrieving a current sound profile corresponding to the currently selected headphones or virtualized, virtual, or emulatable headphones, which establishes or defines audio behaviors, characteristics, properties, or parameters of the currently selected headphones or virtualized, virtual, or emulatable headphones relative to the physical reference headphones; and (iv) communicating the current sound profile to a processing unit or an audio processor such as a Digital Signal Processor (DSP) and/or a flash memory carried by or residing within the reference headphones, such that the current sound profile can be stored in the flash memory and subsequently utilized by the DSP for purpose of emulating the audio performance, behavior, or characteristics of the currently selected headphones or virtualized, virtual, or emulatable headphones.

Communication between the reference headphones and the headphone management app can occur by way of wireless communication and/or wire-based communication. More particularly, in several embodiments, such wireless communication can occur by way of a conventional wireless communication modality such as Bluetooth® communication and associated Bluetooth® chips or chipsets in each of the personal communication device and the reference headphones; and such wire-based communication can occur by way of a first wire-based communication modality such as Universal Serial Bus (USB) communication over a USB cable and associated USB interfaces in each of the personal communication device and the reference headphones. In other embodiments, such wireless communication can occur by way of magnetic induction (MI), e.g., near field MI communication. Different types of wireless and wire-based communication modalities will be readily understood by individuals having ordinary skill in the relevant art.

The media player is configured for playing or playing back stored and/or streamed data files having digital audio data included or encoded therein, for instance, digital audio and/or digital audio-visual data files having file extensions such as .wav, .mp3, .mp4, .wma, .ogg, .aif, .aifc, .aiff, .ea, .midi, .ra, .rm, and/or related, similar, or other file extensions corresponding to digital audio data file or digital audio-visual data file formats, in a manner readily understood by individuals having ordinary skill in the relevant art. Thus, the media player is configured for outputting digital audio data when it is active in a play or playback mode.

Depending upon embodiment details, the personal communication device can have one or more digital interfaces by which digital audio data can be communicated to the reference headphones; and/or an analog interface by which analog audio signals can be communicated to the reference headphones. For instance, digital audio data output by the media player can be transferred from the personal communication device to the reference headphones by way of wireless communication (e.g., Bluetooth® data transfer), or the first wire-based communication modality (e.g., USB data transfer). After receiving digital audio data, the reference headphones' DSP processes and transforms such data in accordance with the current sound profile stored in the reference headphones' flash memory, as further detailed below.

The personal communication device's analog interface includes an audio codec, as individuals having ordinary skill in the relevant art will clearly understand. Analog audio signals output by the audio codec can be communicated from the personal communication device to the reference headphones by way of a distinct second wire-based communication modality, such as analog audio signal transfer over a conventional audio cable, for instance, an audio cable having a standard 3.5 mm audio jack. In such embodiments, the reference headphones include an analog to digital converter (ADC) that receives and converts such audio signals to digital audio data, after which the reference headphones' DSP can process and transform this digital audio data in accordance with the current sound profile stored in the reference headphones' flash memory, as elaborated upon below.

While the media player is outputting digital audio data in a play or playback mode, the reference headphones can be or are active with respect to receiving digital audio data from the personal communication device, or receiving and converting analog audio signals output by the personal communication device to digital audio data. The reference headphones' DSP processes and transforms such received or generated digital audio data in accordance with the currently selected sound profile, thereby generating transformed digital audio data.

The reference headphones also include a digital to analog converter (DAC) that converts transformed digital audio data to transformed analog audio signals; and an amplifier that amplifies the transformed audio signals prior to outputting the transformed analog audio signals to the sound drivers, such that transformed sounds or sound waves are produced, as individuals having ordinary skill in the relevant art will readily comprehend.

For purpose of brevity and clarity, in the description that follows, reference to the currently selected headphones or currently selected set of headphones encompasses or corresponds or is equivalent to the currently selected set of virtualized, virtual, or emulatable headphones indicated above.

Because the aforementioned transformed digital audio data was generated in accordance with the current sound profile, which represents, closely establishes, or defines the audio performance, behaviors, or characteristics of the currently selected headphones relative to the physical reference headphones, the transformed sounds or sound waves generated by way of the transformed digital audio data emulate or closely mimic the sounds or sound waves that would be produced in the event that the currently selected headphones were actually currently in physical use by the user, e.g., actually being worn by the user instead of the reference headphones while the media player is in a play or playback mode and is outputting audio signals or digital audio data directed to user-worn headphones. The transformed digital audio data generated by the reference headphones' DSP using the current sound profile corresponding to the currently selected headphones can thus be referred to as emulated digital audio data.

A headphone system in accordance with an embodiment of the present disclosure can thus utilize a single set of reference headphones to emulate the audio performance of multiple distinct or different headphone types or models produced by one or more manufacturers by way of repeatedly performing a headphone emulation process that corresponds to or which can be defined by the following process portions (a) through (g):

(a) presenting visual indications or representations of multiple distinct or different headphone models to the user by way of the headphone management app's user interface;

(b) receiving user input that identifies first or next headphones presented by this user interface as the currently selected headphones;

(c) transferring to the reference headphones (e.g., by way of storing in a memory thereof) a current audio profile corresponding to the currently selected headphones;

(d) while the media player is in a play or playback mode, communicating digital audio data output by the media player to the reference headphones, or communicating corresponding analog audio signals to the reference headphones and converting such analog audio signals to digital audio data;

(e) processing (e.g., by way of the DSP) such digital audio data and generating transformed or emulated digital audio data in accordance with a set of program instructions and/or a set of audio data transformations or mappings defined by the current audio profile;

(f) generating and amplifying transformed or emulated analog audio signals from the transformed or emulated digital audio data; and (g) producing transformed or emulated sounds using the transformed or emulated analog audio signals to thereby emulate the audio performance of the currently selected headphones.

In view of the foregoing, embodiments in accordance with the present disclosure can create, store, and implement one or more distinct virtualized headphones, where a given virtualized set of headphones represents or corresponds to (i) a specific headphone type or model produced by a particular headphone manufacturer, and (ii) the particular sound profile for this specific headphone type or model relative to the reference headphones. Thus, the audio performance of the virtualized set of headphones under consideration relative to the reference headphones is represented or established by a specific sound profile determined or defined for the specific headphone type or model under consideration. A given virtualized set of headphones can be implemented by way of generating transformed or emulated digital audio data using its corresponding sound profile, e.g., in a manner indicated above.

Further to the foregoing, the reference headphones include a set of power sources such as a set of batteries, which depending upon embodiment details is physically partitioned or logically or virtually partitioned into a main or primary battery or battery unit having a first electrical charge storage capacity, and a backup or secondary battery or battery unit having a second electrical charge storage capacity that is typically less than the first electrical charge storage capacity. For instance, the electrical charge storage capacity of the main battery or battery unit is typically at least twice as great as that of the backup battery or battery unit.

In embodiments in which the main battery and the backup battery are physically partitioned, the main battery and the backup battery exist as physically and/or spatially separate batteries or battery units that each store electrical charge. In embodiments in which the main battery and the backup battery are logically or virtually partitioned, the main battery and the backup battery are physically implemented as a unified or single physical battery or battery unit having a total electrical charge storage capacity, and a reference headphones power management unit, module (e.g., comprising program instructions that are executable by a processing unit, such as the DSP), chip, and/or circuit manages the provision of primary, main, or full headphone functionality or functions while the amount of stored electrical charge in the single battery or battery unit is above a threshold level or threshold percentage of its total stored electrical charge storage capacity, and the provision of secondary, backup, or limited headphone functionality or functions once the amount of stored electrical charge reaches or falls below the threshold level or threshold percentage of the total stored electrical charge storage capacity, until the unified or single physical battery or battery unit is fully depleted. The unified or single physical battery or battery unit can thus be considered or defined as a logical primary or main battery corresponding to the primary, main, or full headphone functionality provided when stored electrical charge is above the threshold level or threshold percentage, and a logical backup battery corresponding to the secondary, backup, or limited headphone functionality provided when stored electrical charge is at or below the threshold level or threshold percentage, where the threshold level or threshold percentage corresponds to a transition between the logical primary or main battery being active for the provision of primary, main, or full headphone functionality, and the logical secondary or backup battery being active for the provision of secondary, backup, or limited headphone functionality. In several embodiments, the threshold level or threshold percentage of the total electrical charge storage capacity corresponds to a condition in which approximately $\frac{2}{3}$ of the stored electrical charge in the unified or single physical battery or battery unit has been depleted corresponding to full depletion of the logical primary or main battery, and $\frac{1}{3}$ of the stored electrical charge in the unified or single physical battery or battery unit remains corresponding to a fully charged logical secondary or backup battery partition. Thus, in such an embodiment the unified or single physical battery or battery unit is logically or virtually partitioned into a logical primary or main battery having or allocated $\frac{2}{3}$ of the total stored electrical charge capacity of the unified or single physical battery or battery unit, and a logical secondary or backup battery having or allocated $\frac{1}{3}$ of the total stored electrical charge capacity of the unified or single physical battery or battery unit. Individuals having ordinary skill in the art will recognize that other threshold levels or percentages can be selected or defined to allocate relative stored electrical charge levels or percentages between the logical primary or main battery and the logical secondary or backup battery, e.g., by way of program instruction execution corresponding to a user configuration interface associated with the reference headphones power management unit, module, chip, and/or circuit.

In various embodiments, regardless of whether the main battery and the backup battery are physically partitioned or logically partitioned, the main battery is configured for providing main electrical power for the circuitry within the reference headphones, including wireless communication (e.g., Bluetooth®) circuitry, DSP circuitry, the flash memory, and a set of amplifiers, such that the reference headphones can provide main or full headphone functionality including or defined as communicating with the headphone management app; storing a current sound profile in and retrieving a current sound profile from the flash memory; receiving or generating digital audio data corresponding to media player output; processing digital audio data to generate transformed or emulated digital audio data in accordance with the current sound profile; and correspondingly generating and amplifying transformed or emulated analog audio signals using the transformed or emulated digital audio data, such that transformed or emulated sounds or sound waves are produced by the sound drivers.

After the electrical charge stored in or corresponding to the main battery has been fully depleted or has reached the aforementioned threshold level or threshold percentage, the backup battery automatically supplies power such that the reference headphones can still be used for generating transformed or emulated sounds. Because wireless communication can consume significant amounts of electrical power, or unnecessarily consume electrical power, which would deplete the smaller electrical charge storage capacity of the backup battery more rapidly than desirable, once the main battery has been fully depleted, the reference headphones' wireless communication capabilities are de-powered or disabled. In multiple embodiments, after the main battery has been fully depleted and the reference headphones' wireless communication capabilities have been de-powered or disabled, the backup battery supplies or continues to supply power to the reference headphones' DSP, flash memory, and amplifiers, such that until the electrical charge stored in the backup battery is fully depleted, the reference headphones are capable of providing backup or limited headphone functionality including converting analog audio signals received by way of the second communication interface (e.g., by way of the 3.5 mm audio cable) to digital audio data; generating transformed or emulated digital audio data in accordance with the current sound profile stored in the flash memory; converting the transformed or emulated digital audio data into transformed or emulated analog audio data; and amplifying the transformed or emulated analog audio data such that the sound drivers can correspondingly output transformed or emulated sounds or sound waves. Once the main battery has been sufficiently recharged, the reference headphones' wireless communication capabilities can be re-powered or (re)enabled.

Individuals having ordinary skill in the relevant art will understand that in various embodiments, the main battery and the backup battery can be recharged by way of a conventional charging interface or port carried by the reference headphones.

Aspects of Representative Sound Profiles

In various embodiments, predetermined reference or native audio performance behaviors, characteristics, properties, or parameters of the reference headphones themselves are measured and stored; and corresponding or counterpart audio performance behaviors, characteristics, properties, or parameters of multiple headphone models produced by one or more manufacturers are measured and stored. A sound profile is then determined for each such headphone make and model, where for any given make and model of headphones, its corresponding sound profile establishes or defines the audio performance characteristics of the headphones under consideration relative to the reference or native audio performance characteristics of the reference headphones. The reference or native audio performance characteristics of the reference headphones can indicate or define the audio performance characteristics of the reference headphones by themselves, without or in the absence of any transformation of audio signals by the DSP unit 440 in accordance with a currently selected sound profile corresponding to any other headphones, such as any given user selectable virtualized headphones.

In various embodiments, the sound profile of a particular make and model of headphones includes a tonal curve or audio tonal equalizer function, along with a corresponding dynamic volume adjustment curve or function applicable thereto; a harmonic distortion curve, as well as a dynamic volume adjustment curve corresponding thereto; and an outside noise injection curve, along with a dynamic volume adjustment curve corresponding thereto, including consideration of active noise cancellation technology. Each aforementioned curve or function is determined with respect to or across the entire dynamic audio range of the make and model under consideration, or the human audio spectrum, or at least the dynamic audio range of the reference headphones. Sound profiles can include program instructions and/or mathematical relationships corresponding to particular or distinct portions of the audio frequency spectrum.

Sound profiles for multiple or many headphone models and manufacturers can be stored in a main repository, database, or library, which headphone management apps executing on personal communication devices can access.

Aspects of Representative Non-Limiting Headphone System Embodiments

FIG. 1A is a block diagram of a headphone system 10 in accordance with a representative embodiment of the present disclosure. In an embodiment, the system 10 includes a personal communication device in the form of a smartphone 100; and a pair of reference headphones 400. Depending upon embodiment details, the smartphone 100 and the reference headphones 400 can be configured for communication relative to or with each other in accordance with one or more of (a) wireless digital data communication, such as by way of Bluetooth® data transfer enabled by a Bluetooth® chipset in each of the smartphone 100 and the reference headphones 400; (b) wire-based digital data communication, such as by way of a USB cable coupled to a USB interface of each of the personal communication device 100 and the reference headphones 300; and (c) analog audio signal transfer by way of a conventional audio cable coupled to a standard audio interface, such as a standard 3.5 mm audio jack, of each of the smartphone 100 and the reference headphones 400.

In an embodiment, the smartphone 100 includes a battery; a processing unit; a set of exterior user controls (e.g., an on/off control, and possibly a set of volume controls); a touch screen display; an audio codec; a wireless communication unit such as a Bluetooth® chipset; a first digital data communication interface such as a USB interface; an analog audio signal communication interface such as a standard 3.5 mm audio jack; and a memory in which an operating system; local media file storage or a local media file library containing digital audio and/or digital audio-visual data files; a media player; a local sound profile library; and a headphone management app reside. The operating system, the media player, and the headphone management app include or are program instruction sets that are executable by the smartphone's processing unit, in a manner readily understood by individuals having ordinary skill in the relevant art.

In an embodiment, the reference headphones 400 include a main battery 402; a physically separate backup battery 404; a power management unit, module, chip, and/or circuit; a set of exterior user controls (e.g., an on/off button); an ADC/DAC unit; a set of amplifiers; a flash memory 430; a wireless communication and DSP unit or chipset 440; a second digital data communication interface, such as a USB interface; an analog audio communication interface, such as a standard 3.5 mm audio jack; and a pair of sound drivers 480. The DSP unit 440 can include or be a conventional digital signal processor, which is configured for executing stored program instructions (e.g., which reside in an associated memory) in accordance with a supported instruction set. Such stored program instructions can form portions of a reference headphones control module, which when executed manages, controls, or performs particular reference headphones operations such as operations set forth herein, in a manner readily understood by individuals having ordinary skill in the relevant art. In some embodiments, the reference headphones 400 includes additional and/or other data processing circuitry, for instance, a processing unit/data processor such as an embedded microcontroller in addition to the DSP unit 440, or as a substitute for the DSP unit 440 provided that the embedded microcontroller can efficiently or suitably perform digital audio data transformation operations such as set forth herein for emulating the audio performance characteristics of user-selected virtualized headphones.

As indicated above, the smartphone 100 executes a headphone management app, which is configured for presenting a visual headphone selection interface 300 on the smartphone 300. The visual headphone selection interface 300 presents or displays multiple user selectable visual representations of headphones, i.e., visual headphone representation, depictions, or images 310*a-e*. Each visual headphone representation 310*a-e* corresponds to or visually indicates or identifies a given type or model of physical headphones produced by a particular headphone manufacturer. For each visual headphone representation 310*a-e*, the visual headphone selection interface 300 typically also presents or displays associated or adjunctive information, such as descriptive text (e.g., which identifies one or more of a headphone manufacturer, model, and audio performance specifications) and/or a user selectable hyperlink to a website that provides this and/or other information (e.g., manufacturer's suggested retail price (MSRP), a date on which the headphone make and model was commercially introduced or released, and/or other information).

Individuals having ordinary skill in the relevant art will clearly understand that the visual headphone selection interface 300 provides user selectable controls for scrolling, such that the user can readily scroll through a collection or list containing more or many more visual headphone representations 310 than can be displayed on the visual headphone selection interface 300 at any one time.

The visual headphone selection interface 300 is responsive to user input that identifies or defines a set of currently selected headphones from the visual headphone representations 310*a-e* available for user selection. Once the user has identified, defined, or specified a particular visual headphone representation 310*a-e* as the currently selected headphones, the headphone management app identifies, retrieves, or determines a corresponding current sound profile for the currently selected headphones. The headphone management app then communicates the current sound profile to the reference headphones 400, such that the current sound profile is stored in the reference headphones flash memory 430.

Figure 1B:
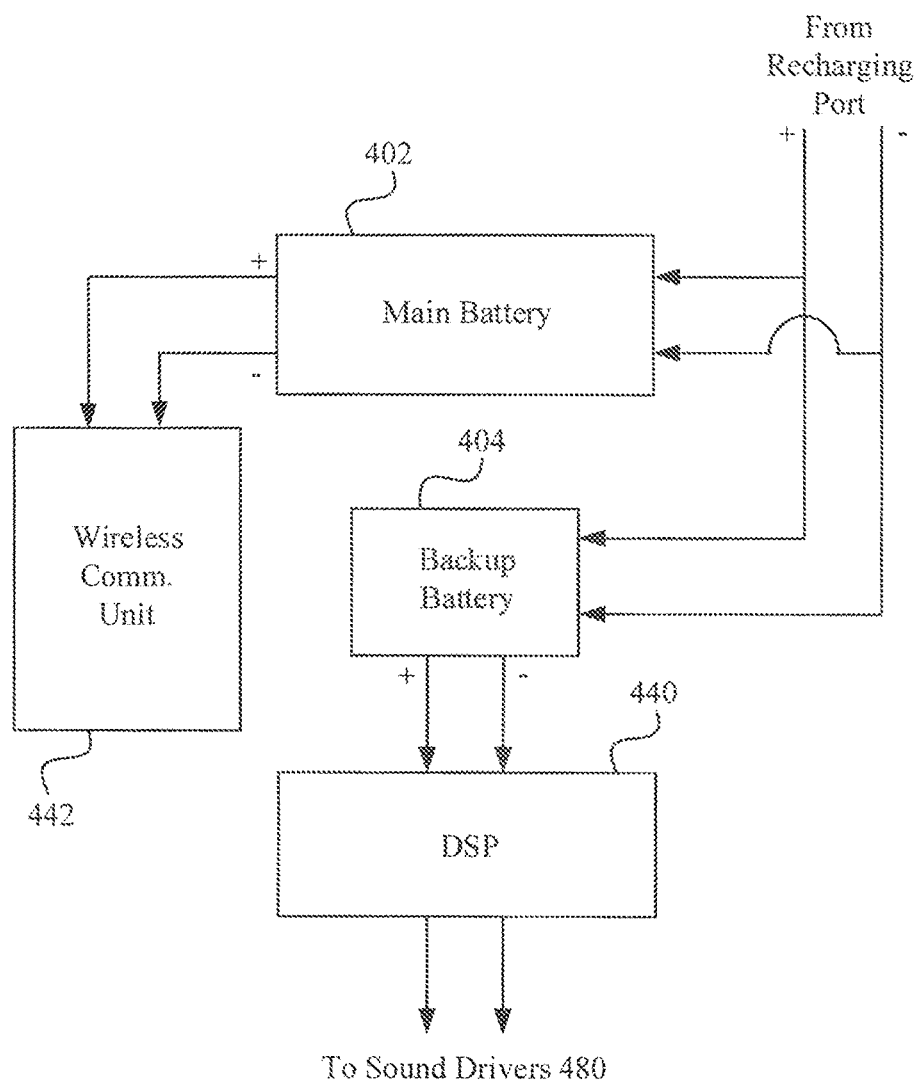
FIG. 1B is a block diagram illustrating further aspects of a headphone system in accordance with an embodiment of the present disclosure, showing a representative electrical powering relationship between a physical main battery or battery unit, a physical backup battery or battery unit, a DSP unit or chipset, and a wireless communication unit.

FIG. 1B is a block diagram illustrating further aspects of a headphone system 10 in accordance with an embodiment of the present disclosure, showing a representative electrical powering relationship between a physical main battery 402, a physical backup battery 404, a DSP unit or chipset 440, and a wireless communication unit 442. Depending upon embodiment details, the wireless communication unit 442 can be physically separate from the DSP unit 440 (e.g., as a separate chip), or it can be an independently or selectively/selectably powerable portion of a chip that includes the DSP unit 440. In such an embodiment, DSP unit 440 is powered by the backup battery 404, which itself receives power from or is charged by the main battery 402. The wireless communication unit 442 is powered by the main battery 402, and is not powered by the backup battery 404. Once the main battery's stored electrical charge is depleted, the wireless communication unit 442 does not remain powered; however, the backup battery 404 continues to power the DSP unit 440.

Figure 1C:
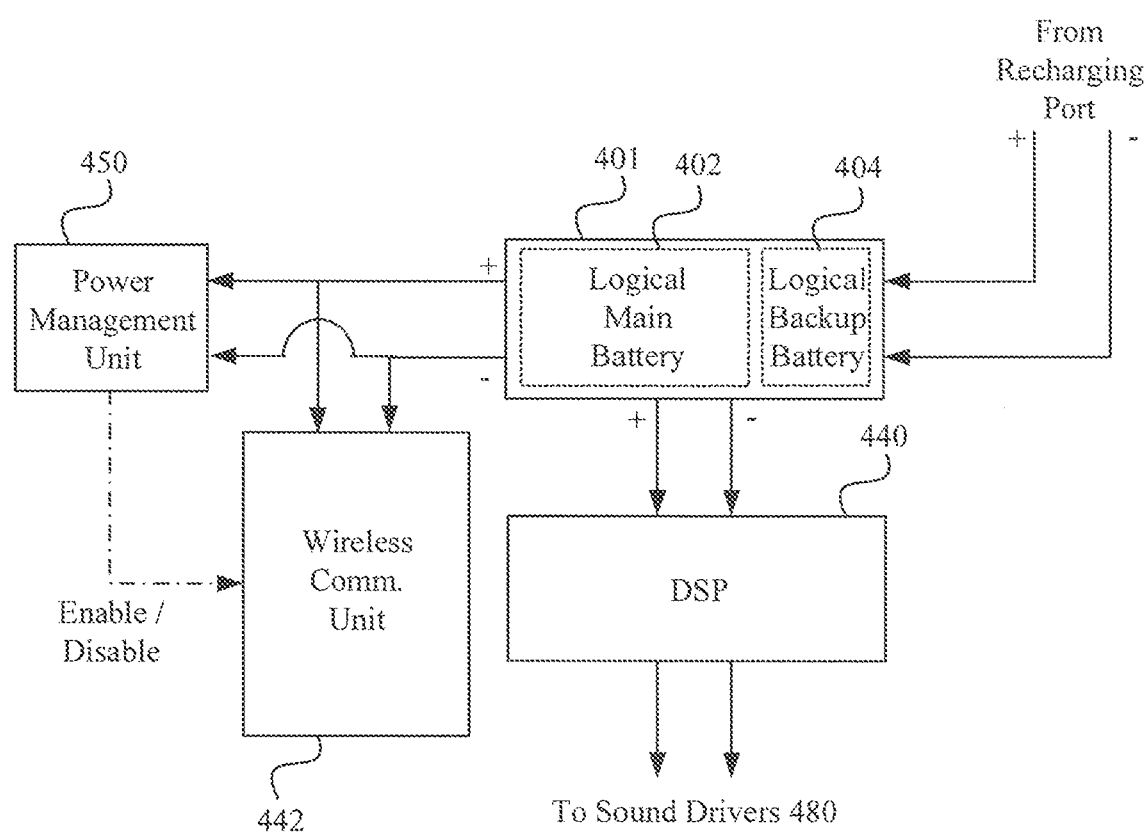
FIG. 1C is a block diagram illustrating aspects of a headphone system in accordance with another embodiment of the present disclosure, showing a representative electrical powering relationship between: a unified or single physical battery or battery unit for which a logical or virtual main battery and a logical or virtual backup battery have been defined in accordance with logical or virtual partitions of the total stored electrical charge capacity of the unified or single physical battery or battery unit; a DSP unit or chipset; a wireless communication unit; and a reference headphones power management unit, module, chip, and/or circuit.

As indicated above, the main battery 402 and the backup battery 404 can be configured or defined as logical or virtual partitions of the total stored electrical charge capacity of a unified or single physical battery or battery unit. FIG. 1C is a block diagram illustrating aspects of a headphone system 10 in accordance with another embodiment of the present disclosure, showing a representative electrical powering relationship between: a unified or single physical battery or battery unit 401 for which a logical or virtual main battery 402 and a logical or virtual backup battery 404 have been defined in accordance with logical or virtual partitions of the total stored electrical charge capacity of the unified or single physical battery or battery unit 401; a DSP unit or chipset 440; a wireless communication unit 442; and a reference headphones power management unit, module, chip, and/or circuit 450. The reference headphones power management unit, module, or chip 450 monitors the amount of stored electrical charge remaining in the unified or single physical battery or battery unit 401. Once the amount of stored electrical charge reaches or falls below a pre-defined or predetermined threshold level or percentage (e.g., $\frac{2}{3}$ of the total stored electrical charge capacity, or $\frac{3}{4}$ of the total stored electrical charge capacity, or another fraction of the total stored electrical charge capacity of the unified or single physical battery or battery unit 401), the reference headphones power management unit, nodule, chip, and/or circuit 450 de-powers or disables the wireless communication unit 442, while continuing or maintaining the delivery of power to the DSP unit 440, as long as the logical backup battery is not fully depleted. Thus, the reference headphones power management unit, module, chip, and/or circuit 450 manages the transition of reference headphone functionality between primary, main, or full headphone functionality and secondary, backup, or limited headphone functionality based on the amount or percentage of stored electrical charge that remains in the unified or single physical battery or battery unit 401, e.g., in a manner set forth above.

In various embodiments the reference headphones 400 supply or provide power to the DSP unit 440 (a) when the main battery 402 (whether physical or logical) is sufficiently charged for providing primary, full, or main headphones functionality, as well as (b) when the main battery 402 (whether physical or logical) is fully depleted and the backup battery 404 (whether physical or logical) is sufficiently charged for providing secondary, backup, or limited headphones functionality, and also (c) when the reference headphones 400 have been turned off by the user, as long as the backup battery 404 (whether physical or logical) is not fully depleted. Consequently, the DSP unit 440 remains active and can access and/or maintain the current sound profile as long as the backup battery 404 is not fully depleted. Thus, even when the reference headphones 400 cannot provide primary, main, or full headphone functionality that includes wireless communication, or when the reference headphones 400 have been transitioned in to an "off" state by the user, as long as the backup battery 404 is not fully depleted the reference headphones 400 can still be used for generating transformed audio signals, e.g., by way of a conventional auxiliary input (e.g., AUX IN) coupled to essentially any audio signal source, such that the reference headphones continue to output audio signals that have been transformed by way of the DSP unit 440 in accordance with the current sound profile because the DSP unit 440 remains active. As will be understood by individuals having ordinary skill in the relevant art, in various embodiments the DSP unit 440 consumes very little power, and thus the backup battery 404 (whether physical or logical) will not be rapidly depleted.

Figure 2:
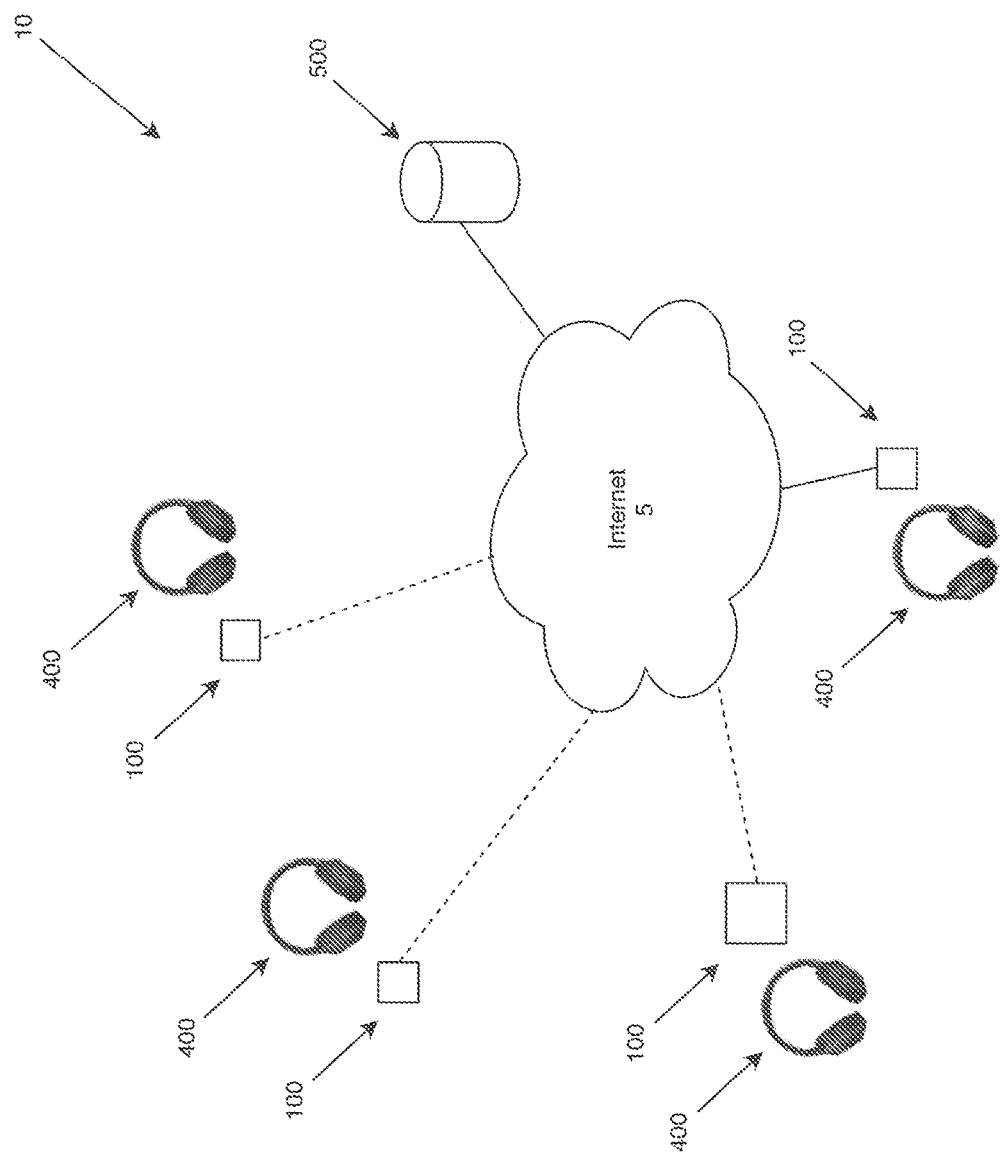
FIG. 2 is an illustration of another or a further representative embodiment of a headphone system in accordance with the present disclosure, which includes a main or remote sound profile database or library that can be accessed by multiple personal communication devices (e.g., one or more smartphones, personal audio devices, tablet computers, laptop computers, and/or desktop computers) by way of headphone management apps executing thereon, and electronic network communication, such as communication over the Internet.

FIG. 2 is an illustration of another or a further representative embodiment of a headphone system 10 in accordance with the present disclosure. In some embodiments, the system 10 also includes a main or remote sound profile database or library 500, which can be accessed by multiple personal communication devices 100 (e.g., one or more smartphones, personal audio devices, tablet computers, laptop computers, and/or desktop computers) by way of headphone management apps executing thereon, and electronic network communication, such as communication over the Internet 5. Each personal communication device 100 has reference headphones 400 associated therewith, in a manner analogous to that described above.

The remote sound profile database 500 can include sound profiles corresponding to many different headphone types, models, and/or manufacturers, and such sound profiles can be communicated or downloaded into each personal communication device's local sound profile library, for instance, under the direction or control of the personal communication device's headphone management app. Each of the personal communication devices 100 provides a visual headphone selection interface 400 in a manner identical, essentially identical, analogous, or similar to that described above.

The above description details aspects of systems, subsystems, apparatuses, devices, processes, and/or procedures in accordance with particular non-limiting representative embodiments of the present disclosure. It will be readily understood by a person having ordinary skill in the relevant art that various modifications can be made to one or more aspects or portions of these and related embodiments without departing from the scope of the present disclosure, which is limited only by the following claims.

The invention claimed is:

1. A method for selectively emulating the audio performance of a user selected set of virtualized headphones from among a plurality of user selectable sets of virtualized headphones, each set of virtualized headphones within the plurality of sets of virtualized headphones corresponding to a particular model of physical headphones and having particular audio performance characteristics, wherein the method comprises:
providing a set of reference physical headphones having native audio performance characteristics and comprising:
a set of power sources;
a digital signal processor (DSP) coupled to the set of power sources;
a memory coupled to the set of power sources;
a set of audio inputs coupled to the DSP, including a digital audio data input and an analog audio signal input; and
a set of speakers coupled to the DSP and by which analog audio signals are output;
providing a media player configured for communicating digital audio data or analog audio signals to the set of reference physical headphones while in an audio play or playback mode;
providing a library storing a sound profile for each set of virtualized headphones, each sound profile corresponding to audio performance characteristics of the set of virtualized headphones relative to the native audio performance characteristics of the reference physical headphones;
providing a user interface that presents visual indications of multiple user-selectable virtualized headphones;
performing a virtualized headphones emulation process comprising:
receiving user input by way of the user interface to establish a first or next selected set of virtualized headphones;
storing in the memory of the reference physical headphones a current sound profile corresponding to the first or next selected set of virtualized headphones;
receiving at the reference headphones digital audio data or analog audio signals output by the media player;
converting by way of the DSP the received digital audio data or analog audio signals into transformed digital audio data in accordance with the current sound profile;
converting the transformed digital audio data into transformed audio signals; and
producing with the set of speakers transformed sounds using the transformed analog audio signals to emulate the audio performance characteristics of the first or next selected set of virtualized headphones;
determining whether the main battery of the set of reference physical headphones is fully depleted: and
de-powering or disabling the first wireless communication unit of the set of reference physical headphones if the main battery is fully depleted, while continuing to provide power to the DSP with the backup battery until the backup battery is fully depleted.

2. The method of claim 1, further comprising repeating the virtualized headphones emulation process to successively (a) select different current sound profiles corresponding to different sets of virtualized headphones in response to user input, (b) store in the memory of the reference physical headphones each current sound profile selected in response to user input, and (c) produce transformed sounds corresponding to each of the different sets of virtualized headphones to thereby emulate the audio performance characteristics thereof.

3. The method of claim 1, wherein the set of power sources includes a main battery and a backup battery, and wherein the set of reference physical headphones includes a first wireless communication unit coupled to the set of power sources, and wherein the method further comprises:
providing a personal communication device configured for wireless audio data communication and wire-based analog audio signal communication with the set of reference physical headphones, wherein the personal communication device comprises:
a processing unit;
a memory coupled to the processing unit and storing program instructions executable by the processing unit corresponding to (i) a headphone management application program, which when executed by the processing unit provides the user interface, and selectively accesses sound profiles within the library or database and communicates a current sound profile to the set of reference physical headphones in response to user input; and (ii) the media player; and
a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

4. The method of claim 1, wherein the set of reference physical headphones further comprises a power management unit coupled to the main battery and the backup battery, wherein the main battery and the backup battery are respectively defined as a logical main battery and a logical backup battery corresponding to a pre-defined or predetermined electrical charge storage partition of a total electrical charge storage capacity of a unified or single physical battery or battery unit, and wherein the method further comprises:
  determining by way of the power management unit whether currently stored electrical charge in the unified or single physical battery or battery unit has fallen below a threshold level or percentage relative to the total electrical charge storage capacity of the unified or single physical battery or battery unit, wherein the threshold level or percentage corresponds to full depletion of the logical main battery and full electrical charge storage capacity of the logical backup battery; and
  de-powering; or disabling the first wireless communication unit if the stored electrical charge in the unified or single physical battery or battery unit has fallen below the threshold level or percentage, while continuing to provide power to the DSP as long as the unified or single physical battery or battery unit is not fully depleted.

5. The method of claim I, wherein the library is couplable to or includes a sound profile database that is remote from each of the personal communication device and the set of reference physical headphones, and which is accessible to the headphone management application program by way of data network communication over the :Internet.

6. A headphone system comprising:
  a set of reference physical headphones having native audio performance characteristics and comprising:
  a set of power sources;
  a set of audio inputs configured for receiving digital audio data or analog audio signals;
  a memory coupled to the set of power sources and storing a current sound profile establishing audio performance characteristics of a current set of virtualized headphones relative to the native audio performance characteristics of the set of reference physical headphones;
  a digital signal processor (DSP) coupled to the set of power sources, the set of audio inputs, and the memory, wherein the DSP is configured to process received digital audio data in accordance with the current sound profile to generate transformed digital audio data;
  a digital to analog converter (DAC) configured to receive transformed digital audio data generated by the DSP; and
  a set of speakers coupled to the DAC and configured for producing transformed sounds by outputting the transformed analog audio signals to emulate the audio performance characteristics of the current set of virtualized headphones,
  wherein the set of power sources comprises a main battery and a backup battery, wherein the set of reference physical headphones further comprises a first wireless communication unit configured for receiving digital audio data from a source external to the set of reference physical headphones and wherein the set of reference physical headphones comprises circuitry configured for (i) powering the first wireless communication unit with the main battery, (ii) de-powering or disabling the first wireless communication circuit once the main battery is full depleted, and GO continuing to provide power to the DSP once the main battery is fully depleted until the backup battery is fully depleted.

7. The headphone system of claim 6, wherein the main battery and the backup battery are separate physical batteries or battery units.

8. The headphone system of claim 6, wherein the main battery and the backup battery are logically defined with respect to a pre-defined or predetermined electrical charge storage partition of a unified or single physical battery or battery unit, and wherein the set of reference physical headphones further comprises a power management unit configured for de-powering or disabling the first wireless communication unit while continuing to provide power to the DSP after the current stored charge in the unified or single physical battery or battery unit has fallen to or below a threshold level, until the unified or single physical battery or battery unit is fully depleted.

9. The headphone system of claim 6, further comprising:
  a personal communication device comprising:
    a processing unit;
    a memory coupled to the processing unit and storing program instructions executable by the processing unit corresponding to (i) a headphone management application program, which when executed by the processing unit provides a user interface, selectively accesses a library storing sound profiles corresponding to different sets of virtualized headphones in response to user input, and communicates a current sound profile corresponding to a current user selected set of virtualized headphones to the set of reference physical headphones in response to user input; and (ii) a media player configured for outputting digital audio data or analog audio signals while in a play or playback mode; and
    a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

10. The headphone system of claim 9, further comprising a remote sound profile database storing multiple sound profiles corresponding to different virtualized headphones, wherein the personal communication device is configured for data communication with the remote sound profile database by way of the Internet.

11. The headphone system of claim 8, further comprising:
  a personal communication device comprising:
    a processing unit;
    a memory coupled to the processing unit and storing program instructions executable by the processing unit corresponding to (i) a headphone management application program, which when executed by the processing unit provides a user interface, selectively accesses a library storing sound profiles corresponding to different sets of virtualized headphones in response to user input, and communicates a current sound profile corresponding to a current user selected set of virtualized headphones to the set of reference physical headphones in response to user input; and (ii) a media player configured for outputting digital audio data or analog audio signals while in a play or playback mode; and
    a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

12. The headphone system of claim 11, further comprising a remote sound profile database storing multiple sound profiles corresponding to different virtualized headphones, wherein the personal communication device is configured for data communication with the remote sound profile database by way of the Internet.

13. The method of claim 2, wherein the set of power sources includes a main battery and a backup battery, and wherein the set of reference physical headphones includes a first wireless communication unit coupled to the set of power sources, and wherein the method further comprises:
providing a personal communication device configured for wireless audio data communication and wire-based analog audio signal communication with the set of reference physical headphones, wherein the personal communication device comprises:
a processing unit;
a memory coupled to the processing unit and storing program instructions executable by the processing unit corresponding to (i) a headphone management application program, which when executed by the processing unit provides the user interface, and selectively accesses sound profiles within the library or database and communicates a current sound profile to the set of reference physical headphones in response to user input; and (ii) the media player; and
a second wireless communication unit coupled to the processing unit by which digital audio data is wirelessly communicable to the set of reference physical headphones, and a wire-based communication unit coupled to the processing unit by which analog audio signals are communicable to the set of reference physical headphones.

14. The method of claim 13, further comprising:
determining whether the main battery of the set of reference physical headphones is fully depleted; and
de-powering or disabling the first wireless communication unit of the set of reference physical headphones if the main battery is fully depleted, while continuing to provide power to the DSP with the backup battery until the backup battery is fully depleted.

15. The method of claim 14, wherein the library is couplable to or includes a sound profile database that is remote from each of the personal communication device and the set of reference physical headphones, and which is accessible to the headphone management application program by way of data network communication over the Internet.

* * * * *